United States Patent
Hen et al.

(10) Patent No.: US 12,511,382 B2
(45) Date of Patent: Dec. 30, 2025

(54) PERFORMING A SECURITY ACTION BASED ON A SUSPICIOUS CROSS AUTHORIZATION EVENT

(71) Applicant: Microsoft Technology Licensing, LLC, Redmond, WA (US)

(72) Inventors: Idan Hen, Tel-Aviv (IL); Ilay Grossman, Tel-Aviv (IL); Avichai Ben David, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/741,768

(22) Filed: Jun. 12, 2024

(65) Prior Publication Data

US 2024/0330450 A1    Oct. 3, 2024

Related U.S. Application Data

(63) Continuation of application No. 17/516,226, filed on Nov. 1, 2021, now Pat. No. 12,039,042.

(51) Int. Cl.
| | |
|---|---|
| *G06F 21/55* | (2013.01) |
| *G06F 21/57* | (2013.01) |
| *G06F 21/60* | (2013.01) |
| *G06N 20/20* | (2019.01) |

(52) U.S. Cl.
CPC .......... *G06F 21/554* (2013.01); *G06F 21/552* (2013.01); *G06F 21/577* (2013.01); *G06F 21/604* (2013.01); *G06N 20/20* (2019.01)

(58) Field of Classification Search
CPC .... G06F 21/554; G06F 21/552; G06F 21/577; G06F 21/604; G06N 20/20
USPC .......................................................... 726/23
See application file for complete search history.

(56) References Cited

U.S. PATENT DOCUMENTS

| | | | |
|---|---|---|---|
| 2019/0260754 A1* | 8/2019 | Hecht | H04L 41/12 |
| 2020/0285737 A1* | 9/2020 | Kraus | G06F 21/552 |
| 2021/0314337 A1* | 10/2021 | Joseph Durairaj | G06F 21/552 |

OTHER PUBLICATIONS

Communication under Rule 71(3) EPC, Received in European Patent Application No. 22801618.4, mailed on Aug. 6, 2025, 06 pages.
Decision to Grant a European patent pursuant to Article 97(1) received in EP Application No. 22801618.4, mailed on Nov. 13, 2025, 2 pages.

* cited by examiner

*Primary Examiner* — Michael S McNally
(74) *Attorney, Agent, or Firm* — Wade IP Law PLLC

(57) ABSTRACT

A system to detect abnormal cross authorizations and take action is described. The system determines whether cross authorization event applied to a first trained anomaly detection model and activity post cross authorization event applied to a second trained anomaly detection model is suspicious. An indicator score is determined from rule-based security indications applied to the cross authorization. A security action is taken based on application of the indicator score applied to a threshold.

20 Claims, 4 Drawing Sheets

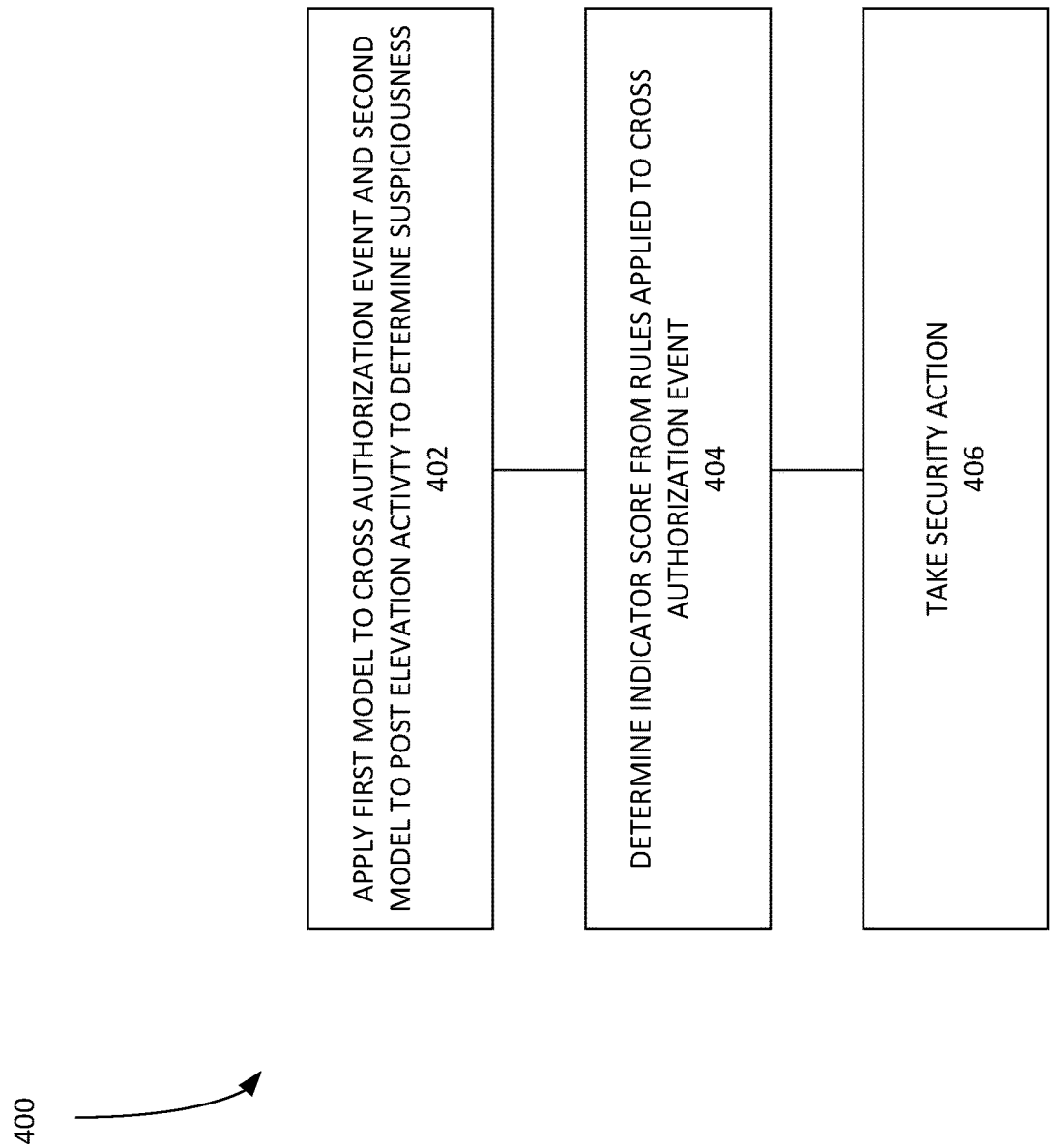

PERFORMING A SECURITY ACTION BASED ON A SUSPICIOUS CROSS AUTHORIZATION EVENT

CROSS-REFERENCE TO RELATED APPLICATION(S)

This application is a continuation of U.S. patent application Ser. No. 17/516,226, entitled "Abnormal Cross Authorization Detection Systems" and filed Nov. 1, 2021, which is incorporated herein by reference in its entirety.

BACKGROUND

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

In one example of a cyberattack, an attacker who has gained access to an account may attempt to modify access privileges to perform actions that evade detection. For instance, an attacker who has gained access to an account in an environment such as identity and access management system may attempt to create highly permissive user or assign a highly permissive role to a user in a resource access management system of the environment in the control of the attacker to perform actions without detection. In many cases, the identity and access management system includes a separate and different roles or administrator privileges from a resource access management system. But an attacker who has gained access to an account with a highly permissive role in an environment such as an identity access management system can apply an access elevating API, such as elevateAccess call, to gain access in the resource access management system. Such authorizations or grant of privileges or permissions across systems may be termed cross authorizations.

A system to detect an abnormal cross authorizations, which can include suspicious cross authorizations that may be the work of attackers, is described. A cross authorization event is applied to a first trained anomaly detection model and post elevation activity related to the cross authorization event is applied to a second trained anomaly detection model to determine whether it is anomalous or suspicious. The first trained anomaly detection model is trained via a first set of feature vectors that represent the cross authorization event from different perspectives. The second trained anomaly detection model is trained via a second set of feature vectors that represent the post elevation activity from different perspectives. The cross authorization event is applied to a rule based security indicator to determine an indicator score. For example, if the first and second trained anomaly detection models determine the cross authorization and post elevation activity are suspicious, the rule based security indicator is called to provide an additional security context for the cross authorization event with the security score. Security action is taken on application of the indicator score to a threshold.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 4 is a block diagram illustrating an example method of the abnormal cross authorization detector of FIG. 2.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
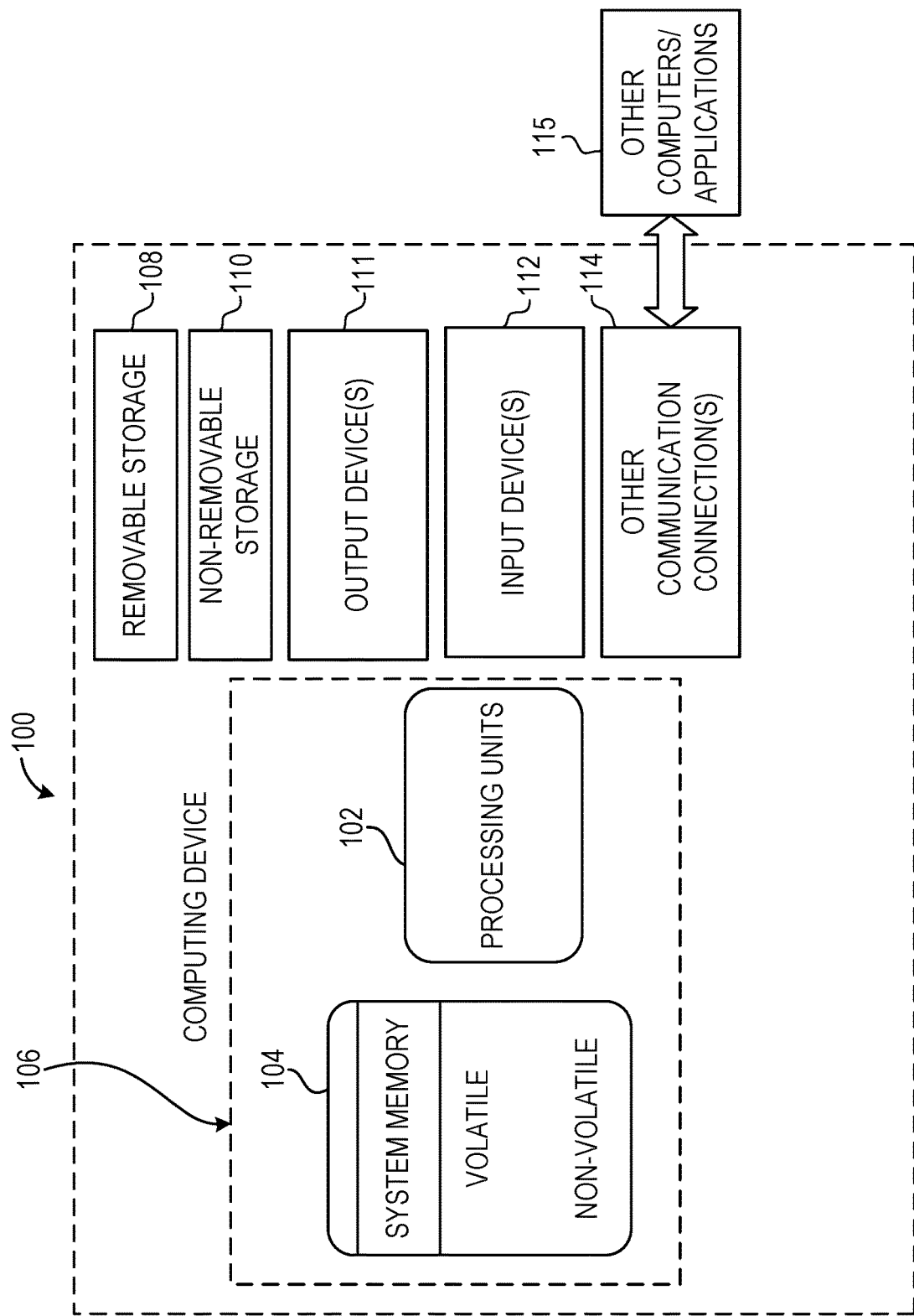
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
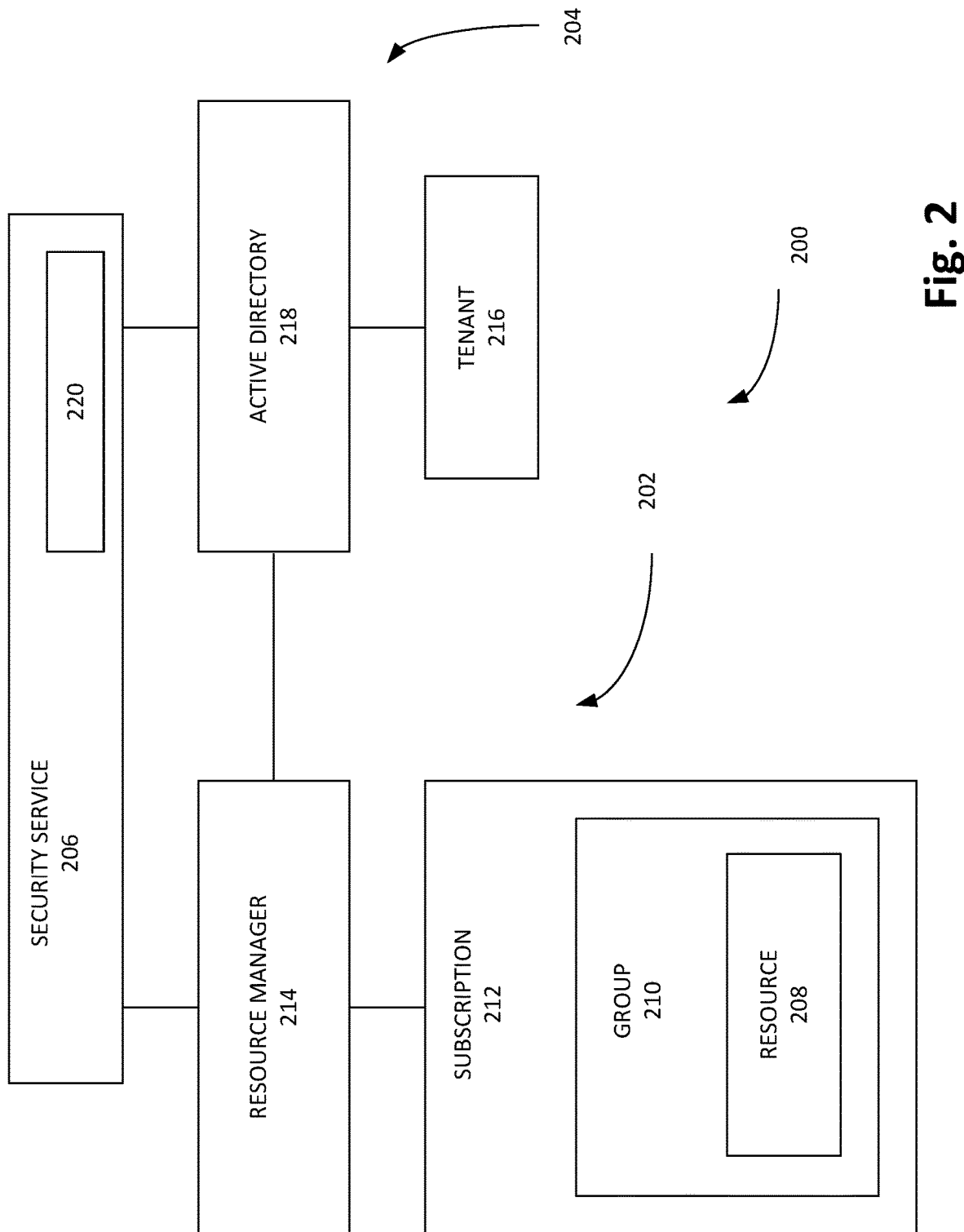
FIG. 2 is a block diagram illustrating an example computer network such as a cloud-computing environment including an abnormal cross authorization detector that can be implemented with the computing device of FIG. 1.

FIG. 2 illustrates an example cloud computing environment 200, which can be configured as a computer network and include hardware and programming and implemented in various settings such as a datacenter. The example cloud computing environment 200 can include resource access management system 202, identity and access management system 204, and security service 206.

The resource access management system 202 manages an entity referred to as a resource 208. Resource 208 can include virtual machines, virtual networks, storage accounts, web applications, databases are examples of resources 208 in the cloud computer environment 200. Resources 208 can include a plurality of resources. Resources 208 can belong to a resource group 210 in the resource access management 202. Resource group 210 includes a container of resources 208. In one example, the resource group 210 includes a container of resources 208 that can be managed as a single entity such as based on lifecycle or security. For instance, resources 208 for an n-tier application may be created or deleted as a resource group 210. The resource group 210, which can be a plurality of resource groups, are associated with a subscription 212. The subscription 212 groups together resource groups 210 and the associated resources 208.

The cloud computing environment 200 may include a front end with many services that orchestrate the functions of the platform including resource manager 214. For instance, the resource manager 214 can host a RESTful API that clients may use to manage resources 208, resource groups 210, or subscription 212. In some examples, the resource manager 214 can manage resources 208 directly from a client request, and in other examples the resource manager 214 can connect via a resource provider to complete the request. For example, a user may manage resources 208 of an associated subscription 212 via a client such as a web portal, command line interface, or other mechanism operably coupled to the resource manager 214, such as a mechanism to connect via REST API, to the resource manager 214. Depending on the configuration of the resource manager 214, the request to manage the resource 208 can be provided directly or via an associated resource provider of the resource 208.

In one example, access to the resources 208 associated with the resource manager 214 can be implemented with an identity and access management system 204, such as with a directory 218. Users are segmented into tenants 216, and a tenant 216 represents a dedicated instances of the directory 218 associated with an enterprise or organization. In one example, the subscription 212 is also associated with a tenant 216, For instance, the tenant 216 may include an account via the cloud computing provider in the cloud computing environment 200 as a subscription 212. Each client request to manage a resource 208 in a particular subscription 212 requires that the user has an identity account in the associated tenant 216. The directory 218 can provide a check that the user has sufficient permission to make the request. Permissions are assigned to users and associated with users with an authorization system.

Access to the resource access management service 202 to perform actions on the resources 208 can be provided via a resource authorization administrators delivered as a classic authorization system or via a fine-grained access authorization system. Examples of a fine-grained access authorization system include features such as role-based access control, commonly referred to as RBAC, or attribute-based access control, commonly referred to as ABAC. Attribute-based access control (ABAC) is an authorization system that defines access based on attributes associated with security principals, resources, and environment. Each of the classic authorization system and the fine-grained authorization system may include a limited number of administrators that have wide-scale access to the resources. A classic authorization system with classic subscription administrators, however, does not provide for additional users that have fine-grained access.

RBAC assigns roles to enforce permissions. A role assignment includes of three elements: security principal, role definition, and scope. A security principal is an object that represents a user, group, service principal, or managed identity, for instance, that is requesting access to resources 208. A role can be assigned to any of these security principals. A role definition, or role, is a collection of permissions. A role definition lists the actions that can be performed, such as read, write, and delete. Roles can be high-level, like owner, or specific, like virtual machine reader. For example, an owner role allows a user to perform any action on a resource. Scope is the set of resources that the access applies to. An assigned role can further limit the actions allowed by defining a scope. For instance, a security principal can be assigned a role of a website contributor, but only for one resource group.

With ABAC, a security principal is granted access to a resource based on attributes. ABAC builds on RBAC by adding role assignment conditions based on attributes in the context of specific actions. A role assignment condition is an additional check that can optionally add to q role assignment to provide more fine-grained access control. A condition filters down permissions granted as a part of the role definition and role assignment. For example, a condition can be added that requires an object to have a specific tag to read the object. RBAC and ABAC systems may include built-in roles that can be assigned different scopes, or may include custom roles.

A classic authorization system, in contrast to fine-grained access authorization systems, provides access to resources managed via a limited number of administrators roles, or classic administrators, which are distinguishable from the fine-grained access administrators. A classic authorization system is not a fine-grained authorization system such as RBAC or ABAC. In one example, the limited number of administrator roles is three administrator roles. For instance, the three administrator roles or classic administrators include an account administrator, a service administrator, and a co-administrator. Classic administrators have full access to the subscription 212 and can manage resources using the portal and various APIs such as a resource manager API with resource manager 214. In one instance, the account used to sign up for platform is automatically set as both the account administrator and service administrator. Then, additional co-administrators can be added. The service administrator and the co-administrators can include similar access of users who have been assigned the owner role at the subscription scope as fundamental roles in a fine-grained access authorization system.

In the example of the three classic administrators, there can be one account administrator per platform account, one service administrator per subscription, and up to two-hundred co-administrators per subscription. For example, an account administrator can include a billing owner of the subscription 212. The account administrator can access the platform portal and manage billing for all subscriptions in the account, change billing for a subscription, create new subscriptions and in some conditions cancel subscriptions, and change the service administrator. In a new subscription, the account administrator becomes the service administrator. The service administrator has the equivalent access of a user who is assigned an owner role at the subscription scope in an RBAC. Further, the service administrator has full access to the platform portal. The service administrator can manage services in the portal, and cancel the subscription, and assign users to the co-administrator role. The co-administrator has the equivalent access of a user who is assigned an owner role at the subscription scope in an RBAC. The co-administrator includes the same access privileges as the service administrator, but cannot change the association of subscriptions to directories, and the co-administrator can assign users to the co-administrator role, but cannot change the service administrator.

Directory administrators can manage the identity and access management system 204 such as create or edit users of the tenant 216, assign directory administrative roles to others, reset passwords, and manage licenses and domains. Examples of directory administrators can include a global administrator, a user administrator, and a billing administrator. The global administrator in one example, can manage access to all administrative features in the directory 218, as well as services that federate to the directory, assign administrator roles to others, and reset the password for users and administrators. The user administrator can create and manage all aspects of users, manage support tickets, monitor service health, and change passwords for users and some administrators such as other user administrators. The billing administrator can make purchases, manage subscriptions, manage support tickets, and monitor service health.

Authorization systems for the resource access management service 202 can be implemented via the resource access management system 202 or the identity and access management system 204. In one example, a user (or security principal) acquires a token for the resource manager 214. The token can include the user's group memberships. The user makes request, such as a REST API call, to the resource manager 214 with the token attached. The resource manager 214 can retrieve the assignments, such as role assignments and deny assignments in a fine-grained authorization system, that apply to the resource 208 upon which the action is being taken. If the user includes a classic administrator permission, access is granted to the permission. For fine-grained access, the resource manager 214 narrows the role assignments that apply to this user or their group and determines what roles the user has for this resource. The resource manager 214 determines if the action in the request is included in the roles the user has for the particular resource. If the user doesn't have a role with the action at the requested scope, access is not granted. Otherwise, the resource manager checks if a deny assignment applies. If a deny assignment applies, access is blocked. Otherwise, access is granted.

Permissions can be granted via the resource access management system 202 or the identity and access management system 204. In one example, a role with access to the resource manager 214 may adjust permissions of other users if such actions are within the permission of the role. For example, a user with service administrator permissions may assign co-administrator permissions to users. In one example, permissions of can be changed via a portal provided via the resource manager 214 or to a portal to the identity and access management system 202 such as via directory 218. The portals may provide a mechanism to access the user or administrator properties, and the properties may include assignments such as users to the highly permissive roles. Environment 200 or resource access management system 202 and identity and access management system 204 can keep track of actions, such as assigning permissive roles or changes to permissions or roles, and other actions, such as activities post assigning roles or changes to permissions from the assigner or assignee with a number of mechanisms, such as via logs (not shown) that account for metadata such as who, what, where, when, and how for changes or updates to the administrators, role definition, or other features of system such as scope, in the authorization system or systems. In one example, the activities related to of assigning or changing permissions or roles or authorizations is an authorization event. An authorization event can be recorded and logs may be kept from various perspectives, such as a system perspective, such as whether the authorization is in the resource access management system 202 and identity and access management system 204, the directory perspective, the subscription perspective, from an assigner perspective (such as circumstances of the user making the permission assignment), and from an assignee perspective (such as circumstances of the user being assigned the permission). Information from each perspective may be stored in the environment 200. Furthermore, actions performed by a user subsequent to an assignment or change in permissions, either or the assigner or the assignee, can be called post elevation activity, and these activities are also stored in a number of mechanisms, such as via logs (not shown) that account for metadata such as who, what, where, when, and how.

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's account is by using social engineering techniques like phishing or by using a storage key that has unintentionally been leaked by an account owner. Hence, one challenge of storage security is to recognize suspicious activity in an account even when the activity is apparently being done by a legitimate user of the account.

In one example, an attacker who has gained access to an account may attempt to modify access privileges to perform actions that evade detection. For instance, an attacker who has gained access to an account with a highly permissive role in an environment such as environment 200 or identity access management system 204 can apply an access elevating API, such as elevateAccess call, to gain access in the resource access management system 202. Such an authorization event when the assigner is in one of the resource access management system 202 or the identity and access system 204 and the assignor is in the other of the resource access management system 202 and the identity and access system 204 is a cross authorization or cross authorization event. In this example, an attacker with access to the identity access management system 204 can perform lateral movement to the resource access management system 202, which may have separate and different roles and permissions. Performing the elevated access may grant the attacker to privilege roles over the environment. An attacker with high permissions or privileges in the resource access management system 202 has broad control over resources 208, resource groups 210, and the subscription 212, as well the ability to grant other accounts broad control or to delete permissions for legitimate users.

Security service 206 may be applied to detect possible cyberattacks in environment 200, such as resource access management system 202, and to take actions, such as prevent access, notify security personnel, or log possible attacks, in response. For example, the security service 206 may provide security alerts and advanced threat protection to the environment 200 as a defender. When the defender detects a threat in any area of the environment 200, the defender can generate a security alert. These alerts describe details of the affected resources 208, suggested remediation steps, and in some cases an option to trigger a response. In one example, security service 206 includes an abnormal cross authorization detection system 220. The abnormal cross authorization detection system 220, in one example, can detect, track, and take actions in the case of a suspicious grant of permission to a user in one of the resource access management system 202 and identity management system 204 to the other of the resource access management system 202 and identity management system 204.

Figure 3:
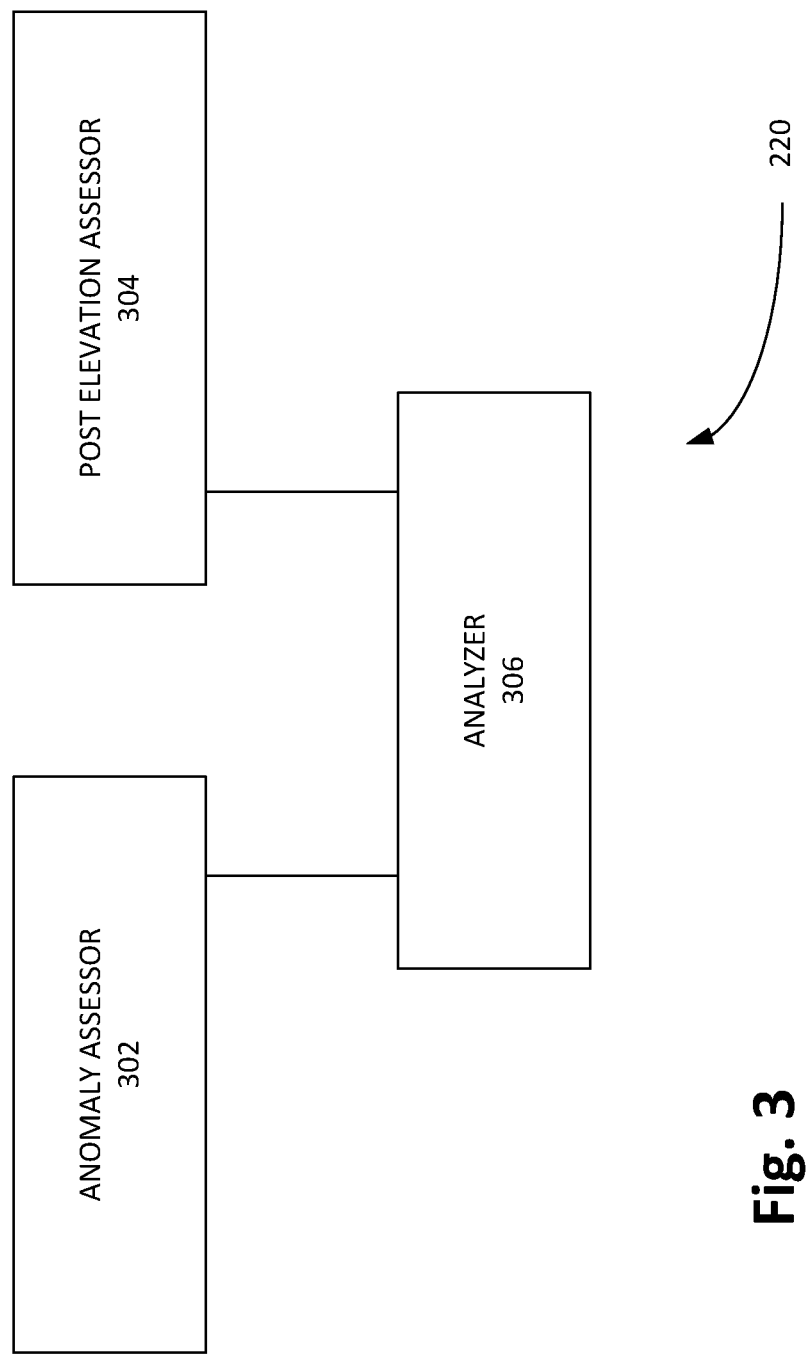
FIG. 3 is a block diagram illustrating an example abnormal cross authorization detector of the network of FIG. 2.

FIG. 3 illustrates an example abnormal cross authorization detection system 220. In one example, the abnormal classic authorization detection system 220 is implemented as system having a processor and a memory device such as processor 102 and memory 104 on computing device 100. The memory device, such as memory 104 can be applied to store computer executable instructions for causing the processor 102 to perform a method that is configured as a program for intrusion detection. The abnormal classic authorization detection system 220 provides cybersecurity for a device, which can include a computing device 100, a plurality of computing devices 100 that may be networked together, and a system including a resource access management system 202 that may be located on premises or in a cloud system. The example abnormal cross authorization detection system 220 includes an access elevation anomaly assessor 302 and a post elevation activity anomaly assessor 304 that provide inputs to an analyzer 306.

The access elevation anomaly assessor 302 can consider several factors of the cross authorization event from various perspectives, such as from the perspective of the identity and access management system 204 and the resource access management system 202, as well as various subgroups of the systems, such as the subscription 212, the directory 218, and other perspectives. A feature vector is created for each perspective considered. For example, a feature vector may include the user agent, the time, the authorization type, and additional elements that may be determined from the cross authorization event. A feature vector from the perspective of one of the identity and access management system 204 or the resource access management system 202 can be different from the feature vector of the other of the identity and access management system 204 and the resource access management system 202. Thus, the access elevation anomaly assessor 302 creates an identity and access management system feature vector from the cross authorization event from the identity and access management system perspective and the resource access management system feature vector from the cross authorization event from the resource access management system perspective.

The access elevation anomaly assessor 302 is based on a machine learning model that can receive cross authorization events. The machine learning model can determine trends and expected actions based on the various cross authorization events for the enterprise or for the environment, which may include a plurality of tenants 216. The machine learning model, including anomaly detection, learns behavioral patterns across different perspectives, such as an identity and access management system feature vector from the cross authorization event from the identity and access management system perspective and the resource access management system feature vector from the cross authorization event from the resource access management system perspective, based on information including the software being used to issue the operation, when it was issued and from where. This information is engineered into features on which a machine learning model can be trained. For example, the model can be continuously trained on an identity and access management system feature vector from the cross authorization event from the identity and access management system perspective and the resource access management system feature vector from the cross authorization event from the resource access management system perspective. In one example, the access elevation anomaly assessor 302 can generate an access elevation anomaly security score based upon an irregular set of the cross authorization event. For instance, the access elevation anomaly assessor 302 may generate a relatively high or low access elevation anomaly security score based on a selected relative scale for an irregular cross authorization event or suspicious cross authorization event according to the model. The access elevation anomaly assessor 302 may generate the other of the relatively high or low access elevation anomaly security score based on a selected relative scale for a regular or non-suspicious cross authorization event according to the model or the access elevation anomaly security score is generated within an expected range for non-suspicious cross authorization events.

The post elevation activity anomaly assessor 304 can consider several factors of the post elevation activity of the both the assigner or assigner of the cross authorization event to determine whether the activities performed by the user or users are anomalous. The post elevation activity anomaly assessor 304 is based on a machine learning model that can receive cross authorization events. The machine learning model can determine trends and expected actions based on the various cross authorization events for the enterprise or for the environment, which may include a plurality of tenants 216. The machine learning model, including anomaly detection, learns behavioral patterns of the assigner and the assignees of cross authorizations, for example, based on information including the software being used to issue the operation, when it was issued and from where. This information is engineered into features on which a machine learning model can be trained. In one example, the post elevation activity anomaly assessor 304 can generate an access elevation anomaly security score based upon irregular post elevation activity, such as activity subsequent the cross authorization event. For instance, the post elevation activity anomaly assessor 304 may generate a relatively high or low access post elevation activity anomaly security score based on a selected relative scale for irregular post elevation activity or suspicious post elevation activity according to the model. The post elevation activity anomaly assessor 304 may generate the other of the relatively high or low post elevation anomaly security score based on a selected relative scale for a regular or non-suspicious post elevation activity according to the model or the post elevation activity security score is generated within an expected range for non-suspicious post elevation activity.

The analyzer 306 receive inputs from the access elevation anomaly assessor 302 and the post elevation activity anomaly assessor 304, including the access elevation anomaly security score and the post elevation activity security score, and develop a final model security score from which the analyzer bases a determination of whether the cross authorization was suspicious or a security risk. In some examples, the final model security score is compared to a threshold, and the analyzer 306 proceeds depending on how the final security score relates to the threshold in a selected manner. Final security model scores outside of a threshold value may indicate a high risk or suspicious cross authorization, and final model security scores within a threshold value may indicate a low security risk for the cross authorization. In other examples, a plurality of thresholds applied to the final model security score. For example, two threshold values may be used in which a first threshold value is greater than a second threshold value. In this example, a final model security score falling above the first threshold value may indicate a high security risk; a final model security scores falling between the first and second threshold value may indicate a moderate security risk; and a final model security score that falls below the second threshold value may indicate a light or no security risk.

The analyzer 306 takes further action upon the determination from the final model security score whether the cross authorization event was suspicious. For example, the analyzer 306 includes a set of rule-based logic to analyze events, or actions, regarding the circumstances of a cross authorization event. In one example, the analyzer 306 has access to the logs and other information regarding the cross authorization event and the post elevation activity and generates an analyzer score from the rules. In one example, a rule may be used that determines how often does the assignor of the cross authorization create assignments or authorizations for the enterprise and at what level of permissions, a rule may be used that determines the level or amount of changes in the permissions, or a rule may take into consideration issues such as whether the assignment was successful, what was the operation result, and other circumstances of the assignor, the assignee, the subscription including actions after the creation event of the classic assignment. The rules applied to an irregular cross authorization may generate a relatively high or low analyzer score based on a selected relative scale to indicate a suspicious cross authorization event. Whereas a non-suspicious authorization event according to the rules of the analyzer 306 may generate an analyzer security score within an expected range for non-suspicious classic events.

The analyzer 306 considers the final model security score and the analyzer security score to take an action. Examples of possible actions based on the final model security score and the analyzer security score can include preventing access to the resources, denying the user from receiving the classic administrator permission, denying the assignor from access and further assigning permissions to other users, alerting an administrator, or actively allowing the access or permission to control.

FIG. 4 illustrates a method 400 performed with or assisted by the abnormal cross authorization detection system 220 to provide cybersecurity for a computer network 200 or resource access management system 202. In one example, the method 400 is implemented as system having a processor and a memory device such as processor 102 and memory 104 on computing device 100. The memory device, such as memory 104 can be applied to store computer executable instructions for causing the processor 102 to perform the method 400, such as a program for intrusion detection or determining the security of the resource access management system 202 and identity and access management system 204. The program for intrusion detection can include a program for assessing anomalies in the creation or modification of cross authorization, or access elevation detector 302, such as via a program to provide the machine learning model of a feature vector from the resource access management system 202 and of a feature vector from the identity and access management system 204 to generate the access elevation anomaly security score. The program can also include a program for assessing post elevation activity such as post elevation activity of the assigner or the assignee of the cross authorization via a post elevation activity anomaly assessor 304, such as via a machine learning model to determine anomalous post elevation activity and to generate a post elevation activity security score. The program can also include an analyzer 306 to determine a final model security score from an analysis of the inputs received, and to apply a rule based assessment if the final model security score indicates a suspicious or anomalous cross authorization, and to generate an analyzer security score from which the security service can base an action. The method 400 provides cybersecurity for the system 202, which can include a computing device 100, a plurality of computing devices 100 that may be networked together and that may be located on premises or in a cloud system. In one example, the method 400 is implemented with abnormal cross authorization detection system 220 that includes the access elevation anomaly assessor 302 and the post elevation activity anomaly assessor 304 to provide inputs to the analyzer 306.

Method 400 includes considering whether a cross authorization event applied to a first trained anomaly detection model and whether post elevation activity related to the cross authorization event applied to a second trained anomaly detection model is suspicious at 402. The cross authorization event is applied to a rule based security indicator to determine an indicator score at 404. Security action is taken on application of the indicator score to a threshold at 406.

In an example of considering whether a cross authorization event applied to a first trained anomaly detection model at 402, the cross authorization event is considered from various perspectives, such as from the perspective of the identity and access management system 204 and the resource access management system 202, as well as various subgroups of the systems, such as the subscription 212, the directory 218, and other perspectives. A feature vector is created for each perspective considered. For example, a feature vector may include the user agent, the time, the authorization type, and additional elements that may be determined from the cross authorization event. A feature vector from the perspective of one of the identity and access management system 204 or the resource access management system 202 can be different from the feature vector of the other of the identity and access management system 204 and the resource access management system 202. Thus, an identity and access management system feature vector from the cross authorization event from the identity and access management system perspective and the resource access management system feature vector from the cross authorization event from the resource access management system perspective are created.

The first trained model can include a machine learning model that can receive cross authorization events. The machine learning model can determine trends and expected actions based on the various cross authorization events for the enterprise or for the environment, which may include a plurality of tenants 216. The machine learning model, including anomaly detection, learns behavioral patterns across different perspectives, such as an identity and access management system feature vector from the cross authorization event from the identity and access management system perspective and the resource access management system feature vector from the cross authorization event from the resource access management system perspective, based on information including the software being used to issue the operation, when it was issued and from where. This information is engineered into features on which a machine learning model can be trained. For example, the model can be continuously trained on an identity and access management system feature vector from the cross authorization event from the identity and access management system perspective and the resource access management system feature vector from the cross authorization event from the resource access management system perspective.

An access elevation anomaly security score can be generated based upon an irregular set of the cross authorization event. For instance, the access elevation anomaly assessor 302 may generate a relatively high or low access elevation anomaly security score based on a selected relative scale for an irregular cross authorization event or suspicious cross authorization event according to the model. The access elevation anomaly assessor 302 may generate the other of the relatively high or low access elevation anomaly security score based on a selected relative scale for a regular or non-suspicious cross authorization event according to the model or the access elevation anomaly security score is generated within an expected range for non-suspicious cross authorization events.

In an example of whether post elevation activity related to the cross authorization event applied to a second trained anomaly detection model is suspicious at 402, several factors of the post elevation activity of the both the assigner or assigner of the cross authorization event are considered to determine whether the activities performed by the user or users are anomalous. The post elevation activity anomaly assessor 304 is based on a machine learning model that can receive cross authorization events. The second trained model can include a machine learning model to determine trends and expected actions based on the various cross authorization events and post authorization activity for the enterprise or for the environment, which may include a plurality of tenants 216. The machine learning model, including anomaly detection, learns behavioral patterns of the assigner and the assignees of cross authorizations, for example, based on information including the software being used to issue the operation, when it was issued and from where. This information is engineered into features on which a machine learning model can be trained. In one example, the post elevation activity anomaly assessor 304 can generate an access elevation anomaly security score based upon irregular post elevation activity, such as activity subsequent the cross authorization event. For instance, the post elevation activity anomaly assessor 304 may generate a relatively high or low access post elevation activity anomaly security score based on a selected relative scale for irregular post elevation activity or suspicious post elevation activity according to the model. The post elevation activity anomaly assessor 304 may generate the other of the relatively high or low post elevation anomaly security score based on a selected relative scale for a regular or non-suspicious post elevation activity according to the model or the post elevation activity security score is generated within an expected range for non-suspicious post elevation activity.

The access elevation anomaly security score and the post elevation activity security score are applied to develop a final model security score from which a determination is made as to whether the cross authorization was suspicious or a security risk at 402. In some examples, the final model security score is compared to a threshold, and the method 400 proceeds depending on how the final security score relates to the threshold in a selected manner. Final security model scores outside of a threshold value may indicate a high risk or suspicious cross authorization, and final model security scores within a threshold value may indicate a low security risk for the cross authorization. If the security risk is low, the method 400 may stop.

The method 400 takes further action upon the determination from the final model security score whether the cross authorization event was suspicious at 404. For example, a set of rule-based logic can be applied to analyze events, or actions, regarding the circumstances of a cross authorization event. In one example, logs and other information regarding the cross authorization event and the post elevation activity can be considered and generates an analyzer score from the rules. In one example, a rule may be used that determines how often does the assignor of the cross authorization create assignments or authorizations for the enterprise and at what level of permissions, a rule may be used that determines the level or amount of changes in the permissions, or a rule may take into consideration issues such as whether the assignment was successful, what was the operation result, and other circumstances of the assignor, the assignee, the subscription including actions after the creation event of the classic assignment. The rules applied to an irregular cross authorization may generate a relatively high or low analyzer score based on a selected relative scale to indicate a suspicious cross authorization event. Whereas a non-suspicious authorization event according to the rules of the analyzer 306 may generate an analyzer security score within an expected range for non-suspicious classic events.

In an example, of the security action taken at 406, the final model security score and the analyzer security score are considered to take an action. For example, if the analyzer security score indicates a security risk, the method 400 takes an action to mitigate the risk. Examples of possible actions based on the analyzer security score can include preventing access to the resources, denying the user from receiving the classic administrator permission, denying the assignor from access and further assigning permissions to other users, alerting an administrator, or actively allowing the access or permission to control.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A system comprising:
    a processor system; and
    a memory that stores computer-executable instructions that are executable by the processor system to at least:
        detect that an account of a first management system is used by an assignor to perform a cross authorization event, the cross authorization event comprising assigning an access privilege associated with a resource that is managed by a second management system to a user of the second management system, the access privilege enabling the user of the second management system to access the resource;
        identify activity of at least one of the assignor or the user that occurs after the cross authorization event is performed;
        determine that the cross authorization event is suspicious using the activity of the at least one of the assignor or the user that occurs after the cross authorization event is performed; and
        perform a security action with regard to the cross authorization event as a result of the cross authorization event being suspicious.

2. The system of claim 1, wherein the computer-executable instructions are executable by the processor system to at least:
    detect that the account of the first management system is used by the assignor to apply an application programming interface, which enables performance of the cross authorization event.

3. The system of claim 1, wherein the first management system is an identity and access management system; and
    wherein the second management system is a resource access management system.

4. The system of claim 1, wherein the computer-executable instructions are executable by the processor system to at least:
    determine that the cross authorization event is suspicious by applying the cross authorization event to a first trained anomaly detection model and by applying the activity, which occurs after the cross authorization event is performed, to a second trained anomaly detection model, which is different from the first trained anomaly detection model.

5. The system of claim 4, wherein the first trained anomaly detection model is trained via a first set of feature vectors that represent the cross authorization event from a plurality of perspectives of a plurality of management systems; and
    wherein the second trained anomaly detection model is trained via a second set of feature vectors that represent the activity, which occurs after the cross authorization event is performed, from the plurality of perspectives of the plurality of management systems.

6. The system of claim 1, wherein the computer-executable instructions are executable by the processor system to at least:
    as the result of the cross authorization event being suspicious, notify security personnel about the cross authorization event being suspicious.

7. The system of claim 1, wherein the first trained anomaly detection model is a first machine learning model; and
    wherein the second trained anomaly detection model is a second machine learning model.

8. The system of claim 1, wherein the computer-executable instructions are executable by the processor system to at least:
    determine that the cross authorization event is suspicious by taking into consideration at least the following:
        the activity that occurs after the cross authorization event is performed;
        a frequency with which the assignor creates assignments or authorizations; and
        whether the assignments or authorizations are successful.

9. A method performed by a computing system, the method comprising:
    detecting that an account of a first management system is used by an assignor to perform a cross authorization event, the cross authorization event comprising assigning an access privilege associated with a resource that is managed by a second management system to a user of the second management system, the access privilege enabling the user of the second management system to access the resource;
    identifying activity of at least one of the assignor or the user that occurs after the cross authorization event is performed;
    determining that the cross authorization event is suspicious using the activity of the at least one of the assignor or the user that occurs after the cross authorization event is performed; and
    performing a security action with regard to the cross authorization event as a result of the cross authorization event being suspicious.

10. The method of claim 9, wherein detecting that the account of the first management system is used comprises:
    detecting that the account of the first management system is used by the assignor to apply an application programming interface, which enables performance of the cross authorization event.

11. The method of claim 9, wherein detecting that the account of the first management system is used by the assignor to perform the cross authorization event comprises:
    detecting that the account of an identity and access management system is used by the assignor to perform the cross authorization event, the cross authorization event comprising assigning the access privilege associated with the resource that is managed by a resource access management system to the user of the resource access management system, the access privilege enabling the user of the resource access management system to access the resource.

12. The method of claim 9, wherein determining that the cross authorization event is suspicious comprises:
    determining that the cross authorization event is suspicious by applying the cross authorization event to a first trained anomaly detection model and by applying the activity, which occurs after the cross authorization event is performed, to a second trained anomaly detection model, which is different from the first trained anomaly detection model.

13. The method of claim 12, wherein the first trained anomaly detection model is trained via a first set of feature vectors that represent the cross authorization event from a plurality of perspectives of a plurality of management systems; and
wherein the second trained anomaly detection model is trained via a second set of feature vectors that represent the activity, which occurs after the cross authorization event is performed, from the plurality of perspectives of the plurality of management systems.

14. The method of claim 9, wherein the first trained anomaly detection model is a first machine learning model; and
wherein the second trained anomaly detection model is a second machine learning model.

15. The method of claim 9, wherein performing the security action with regard to the cross authorization event comprises:
preventing access to the resource as the result of the cross authorization event being suspicious.

16. The method of claim 9, wherein performing the security action with regard to the cross authorization event comprises:
providing a security alert regarding the cross authorization event as the result of the cross authorization event being suspicious, the security alert suggesting remediation steps configured to remedy the cross authorization event.

17. The method of claim 9, wherein performing the security action with regard to the cross authorization event comprises:
providing a security alert regarding the cross authorization event as the result of the cross authorization event being suspicious, the security alert providing an option to trigger a response to the cross authorization event.

18. The method of claim 9, wherein determining that the cross authorization event is suspicious comprises:
determining that the cross authorization event is suspicious using the activity, which occurs after the cross authorization event is performed, and further using a frequency with which the assignor creates assignments or authorizations.

19. The method of claim 9, wherein determining that the cross authorization event is suspicious comprises:
determining that the cross authorization event is suspicious by taking into consideration at least the following:
the activity that occurs after the cross authorization event is performed;
a frequency with which the assignor changes permissions; and
an amount of changes in the permissions.

20. A computer program product comprising a computer-readable storage medium having instructions recorded thereon for enabling a processor-based system to perform operations, the operations comprising:
detecting that an account of an identity and access management system is used by an assignor to perform a cross authorization event, the cross authorization event comprising assigning an access privilege associated with a resource that is managed by a resource access management system to a user of the resource access management system, the access privilege enabling the user of the resource access management system to access the resource;
identifying activity of at least one of the assignor or the user that occurs after the cross authorization event is performed;
determining that the cross authorization event is suspicious using the activity of the at least one of the assignor or the user that occurs after the cross authorization event is performed; and
performing a security action with regard to the cross authorization event as a result of the cross authorization event being suspicious.

* * * * *